(12) United States Patent
Chai et al.

(10) Patent No.: US 10,732,002 B2
(45) Date of Patent: Aug. 4, 2020

(54) GENERATING ACCURATE SPEED ESTIMATIONS USING AGGREGATED TELEMETRY DATA

(71) Applicant: Mapbox, Inc., San Francisco, CA (US)

(72) Inventors: Lily Chai, San Francisco, CA (US); Morgan Herlocker, Oakland, CA (US)

(73) Assignee: Mapbox, Inc., San Francisco, CA (US)

( * ) Notice: Subject to any disclaimer, the term of this patent is extended or adjusted under 35 U.S.C. 154(b) by 102 days.

(21) Appl. No.: 15/693,193

(22) Filed: Aug. 31, 2017

(65) Prior Publication Data

US 2019/0063939 A1 Feb. 28, 2019

(51) Int. Cl.
| | | |
|---|---|---|
| G01C 21/34 | (2006.01) | |
| G01C 21/36 | (2006.01) | |
| G06F 16/29 | (2019.01) | |
| G01C 21/32 | (2006.01) | |

(52) U.S. Cl.
CPC ......... *G01C 21/3492* (2013.01); *G01C 21/32* (2013.01); *G01C 21/3691* (2013.01); *G01C 21/3697* (2013.01); *G06F 16/29* (2019.01)

(58) Field of Classification Search
CPC ............ G01C 21/3492; G01C 21/3697; G06F 17/30241
USPC ...................................................... 701/532
See application file for complete search history.

(56) References Cited

U.S. PATENT DOCUMENTS

| | | | | |
|---|---|---|---|---|
| 6,810,321 B1* | 10/2004 | Cook | ................... | G08G 1/0104 340/905 |
| 2007/0299599 A1* | 12/2007 | Letchner | ............ | G01C 21/3484 701/424 |
| 2011/0298603 A1* | 12/2011 | King | ...................... | G08G 1/042 340/436 |
| 2014/0145862 A1* | 5/2014 | Wang | ..................... | G08G 1/141 340/932.2 |
| 2014/0278052 A1* | 9/2014 | Slavin | ................ | G01C 21/3492 701/400 |
| 2015/0006069 A1* | 1/2015 | Kwon | .................... | G08G 1/052 701/119 |
| 2016/0180719 A1* | 6/2016 | Wouhaybi | ............ | G08G 5/0082 701/4 |
| 2016/0305794 A1* | 10/2016 | Horita | ................. | G01C 21/3602 |
| 2016/0364983 A1* | 12/2016 | Downs | ................. | G08G 1/0108 |
| 2016/0379489 A1* | 12/2016 | Macfarlane | .......... | G08G 1/0129 701/119 |
| 2017/0255966 A1* | 9/2017 | Khoury | ................ | G08G 1/0129 |

\* cited by examiner

*Primary Examiner* — Khoi H Tran
*Assistant Examiner* — Rodney P King
(74) *Attorney, Agent, or Firm* — Fenwick & West LLP

(57) ABSTRACT

A method for providing an improvement in speed estimation for route planning involves identifying a plurality of observed speeds for a segment of road during a first time period, the plurality of observed speeds corresponding to the plurality of traces of the segment of road. The method further involves identifying a plurality of discrete values in the plurality of observed speeds, and determining a count for each of the plurality of discrete values. The method further involves aggregating the counts for the plurality of traces including the segment to create aggregated counts for the segment, and determining the speed estimate from the aggregated counts for the plurality of traces including the segment.

20 Claims, 5 Drawing Sheets

GENERATING ACCURATE SPEED ESTIMATIONS USING AGGREGATED TELEMETRY DATA

BACKGROUND

Digitally stored electronic maps are used to provide directions to users of mobile devices, for example, using any of a wide array of standalone map or direction application programs or apps. Today's electronic maps correctly determine where a mobile device is within a few feet or meters, or show where the user of that mobile device is on the electronic map in real time. Electronic maps also typically include other functionality, such as providing turn-by-turn directions to nearly any location. Additional elements such as traffic or wrecks may also be shown.

Electronic maps also appear in other applications aside from standalone mapping applications. For example, ride sharing applications, taxi applications, video games, and other applications may use digital maps. These or other applications can obtain electronic maps by calling a map server computer through an Application Programming Interface (API). Thus, a single electronic map provider that owns or operates the server computer may supply the electronic maps for many different applications.

When a mobile device is using an electronic map, the location of the mobile device can be determined using WiFi or the Global Positioning System (GPS), which reports a device location using latitude and longitude, and optionally height and time as well. This location data, as well as other data, may be collected by the electronic map provider and may be termed "telemetry" data for the mobile device. Other information, such as speed, heading, acceleration, and deceleration may be calculated using the GPS data. Individually, or in combination, the telemetry data may be used for many different applications. For example, speed may be used to estimate the average or expected speed of travel on a road. The average or expected speed of travel may then be used, along with other information, to accurately estimate arrival time at a destination. However, managing the large amounts of telemetry data that can be received is challenging. In fact, there may be so many speed observations for a road that storing the speed observations, or determining a speed estimation, may become an extremely time and resource intensive process.

SUMMARY

Systems and methods for providing an improvement in speed estimation for route planning are provided herein. Data collected by many devices that have previously travelled along a road segment is useful for estimating a predicted speed of travel along that road segment. To be able to quickly calculate a speed estimate along a particular road segment based on a large set of collected data, the systems and methods described herein aggregate data received from many users for the road segment. The aggregated data can be quickly analyzed to provide a fast and accurate speed or travel time estimate. In some embodiments, the received speed data for a particular segment of road is accumulated as a histogram that counts the number of times each speed is observed. A histogram data structure reflects the data from many users while using a small amount of memory and being fast to access and analyze. In some embodiments, multiple histograms for a particular road segment are aggregated. For example, a single histogram may represent data collected along one segment of road, within one time frame (e.g., 6:30-6:40 am) on one day (e.g., Tuesday, Aug. 1, 2017). Multiple histograms can be aggregated together, e.g., the histograms for the 6:30-6:40 am time period over the past 3 weekdays may be aggregated. When a speed estimate is requested, the appropriate histogram or aggregated histogram can be used to determine a speed estimate for traversing the road segment, e.g., by finding the speed at a given percentile in the histogram.

In some embodiments, the systems and methods receive as input a plurality of traces of a segment of road. As used herein, a trace is a set of data that describes a path taken by a device. For example, a trace of a path traversed by a GPS-enabled device during a trip may include a set of location coordinates along the path and time-stamps or speeds associated with some or all of the location coordinates. For example, a trace over a set of road segments that includes location coordinates and associated time stamps can be used to calculate the average speed for traversing each of the road segments based on the times at each end of each road segment.

In some embodiments, a method involves identifying a plurality of observed speeds for a segment of road during a first time period, the plurality of observed speeds corresponding to the plurality of traces of the segment of road. The method further involves identifying a plurality of discrete values in the plurality of observed speeds, and determining a count for each of the plurality of discrete values. The method further involves aggregating the counts for the plurality of traces including the segment to create aggregated counts for the segment, and determining the speed estimate from the aggregated counts for the plurality of traces including the segment.

DETAILED DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Computer-implemented techniques are provided for estimating speed using aggregated telemetry data. In various embodiments, telemetry data is received from mobile computing devices. The received telemetry data may include speed observations, or may be processed to generate speed observations that are associated with a road or portions of a road. As part of the process of determining a speed estimation for a road or a portion of a road, the speed observations are mapped to predetermined discrete values. The predetermined discrete values may be, for example, whole numbers within a range, such as whole numbers from 0 to 160 kilometers per hour, 0-200 miles per hour. The speed observations may be mapped by rounding up or rounding down, as appropriate, and the mapping may vary based on the quantity or spacing of the predetermined discrete values.

Subsequently, histograms are generated that represent the amount of times, or count, each discrete value appears in the mapped speed observations. The histograms are generated for specified time periods, such as every 15 minutes, and are stored. The speed observation data is not stored. Aggregated histograms are generated using multiple histograms, and may be generated to represent varying time periods as needed.

In some embodiments, the speed observations are digitally stored as sets of counts of observations occurring at a plurality of different speed magnitudes. For example, the speed observations could be stored as an array of two hundred memory locations or addresses that store counts of speed observations where the first memory location stores counts of observed speed values of 1 km/h, the second memory location is for counts of speeds observed at 2 km/h, etc.

A speed is then estimated for a road or a portion of a road using an associated aggregated histogram. The speed estimate may be used for many different applications, such as determining an arrival time at a destination.

Other embodiments, aspects and features will become apparent from the disclosure as a whole.

Figure 1:
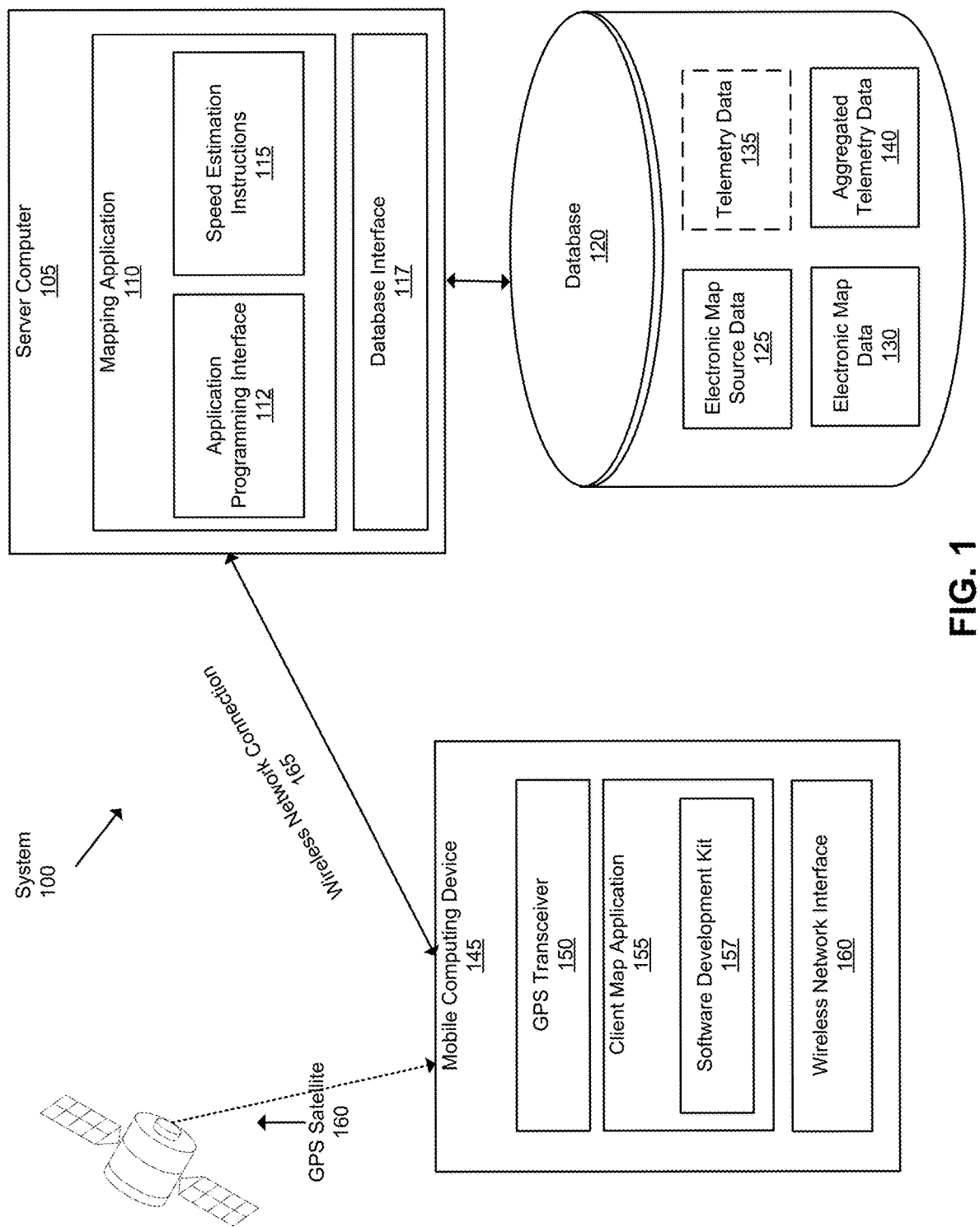
FIG. 1 illustrates an example computer system in which the techniques described may be practiced, according to one embodiment.

FIG. 1 illustrates an example computer system in which the techniques described may be practiced, according to one embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite is coupled via a wireless connection to the mobile computing device 145. The server computer 105 comprises a mapping application 110, an application programming interface (API) 112, speed estimation instructions 115 and a database interface 117. The database 120 comprises electronic map source data 125, electronic map data 130, telemetry data 135, and aggregated telemetry data 140. The mobile computing device 145 comprises a GPS transceiver 150, client map application 155, software development kit (SDK) 157 and wireless network interface 159.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of custom software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, telemetry data 135, and aggregated telemetry data 140. These datasets may be stored as columnar data in a relational database or as flat files.

In one embodiment, electronic map source data 125 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector tiles which may be subject to style data to impose different display styles. Electronic map data 130 may be updated at any suitable interval, and may include additional information beyond that derived from electronic map source data 125. For example, using aggregated telemetry data 140, discussed below, various additional information may be stored in the vector tiles, such as traffic patterns, turn restrictions, detours, common or popular routes, speed limits, new streets, and any other information related to electronic maps or the use of electronic maps.

In one embodiment, telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 140.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

In one embodiment, aggregated telemetry data 140 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 140 is stored in association with one or more tiles related to electronic map data 130. Aggregated telemetry data 140 may be stored for any amount of time, such as a day, a week, or more. Aggregated telemetry data 140 may be further processed or used by various applications or functions as needed.

In one embodiment, mobile computing device 145 is any mobile computing device, such as a laptop computer, handheld computer, wearable computer, cellular or mobile phone, portable digital assistant (PDAs, or tablet computer. Although a single mobile computing device is depicted in FIG. 1, any number of mobile computing devices may be present. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS transceiver 150. GPS transceiver 150 is a transceiver used by mobile computing device 145 to receive signals from GPS satellite 160, which broadly represents three or more satellites from which the mobile computing device may receive signals for resolution into a latitude-longitude position via triangulation calculations.

Mobile computing device 145 also includes wireless network interface 159 which is used by the mobile computing device to communicate wirelessly with other devices. In particular, wireless network interface 159 is used to establish wireless network connection 165 to server computer 105. Wireless network interface 159 may use WiFi, WiMAX, Bluetooth, ZigBee, cellular standards or others.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to mobile computing device. In one embodiment, mobile computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In server computer 105, the mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 140, receiving electronic map source data 125 from data providers, processing electronic map source data 125 to generate electronic map data 130, and any other aspects of embodiments described herein. Mapping application 110 includes speed estimation instructions 115 which are programmed or configured to estimate speed using aggregated telemetry data.

According to one embodiment, the techniques described herein are implemented by one or more special-purpose computing devices. For example, the server computer 105 and mobile computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 2:
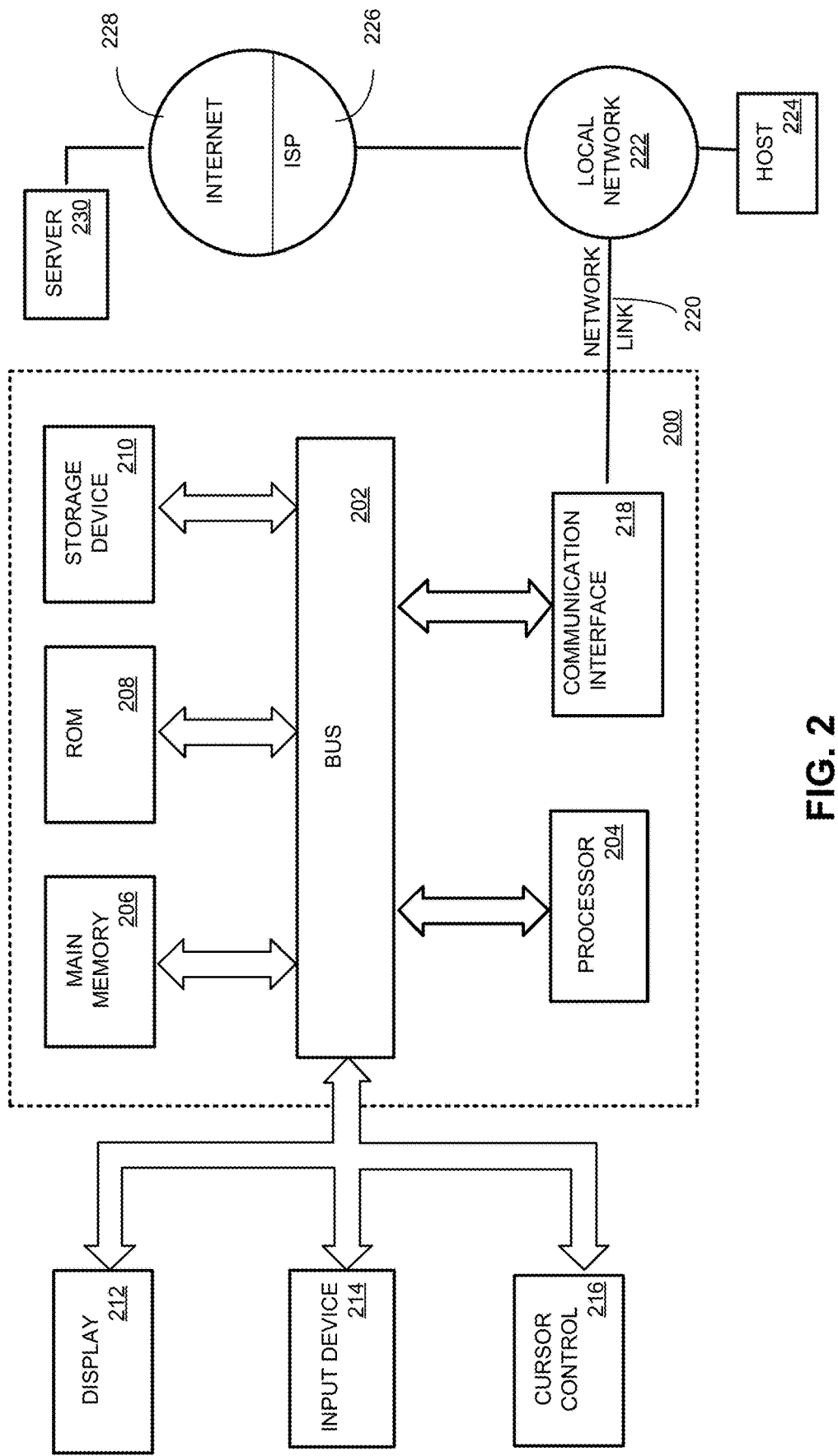
FIG. 2 illustrates a computer system upon which an embodiment may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a LCD screen, LED screen, or touch screen, for displaying information to a computer user. An input device 214, which may include alphanumeric and other keys, buttons, a mouse, a touchscreen, or other input elements is coupled to bus 202 for communicating information and command selections to processor 204. In some embodiments, the computer system 200 may also include a cursor control 216, such as a mouse, a trackball, or cursor direction keys for communicating direction information and command selections to processor 204 and for controlling cursor movement on display 212. The cursor control 216 typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. The received code may be executed by processor 204 as it is received, and stored in storage device 210, or other non-volatile storage for later execution.

In one embodiment, the speed estimation instructions 115 include instructions for generating speed histograms, aggregating speed histograms, and using the aggregated speed histograms to generate speed estimates. The instructions to generate speed histograms may include instructions to generate a speed histogram for each of many segments of a road. For example, as described above, the aggregated telemetry data 140 is obtained by segmenting a continuous set of related telemetry data 135 into different segments or chunks representing portions of travel along a route. A segment may be associated with one or more roads, and it may be specific to a direction of travel along the road, a lane within the road, or both a direction and a lane. The speed estimation instructions 115 may instruct the mapping application 110 to generate a histogram for each of the segments identified in the aggregated telemetry data 140. In some embodiments, the speed estimation instructions 115 instruct the mapping application 110 to generate multiple histograms for a given segment of road, each histogram representing data from a particular day and time of day.

Figure 3:
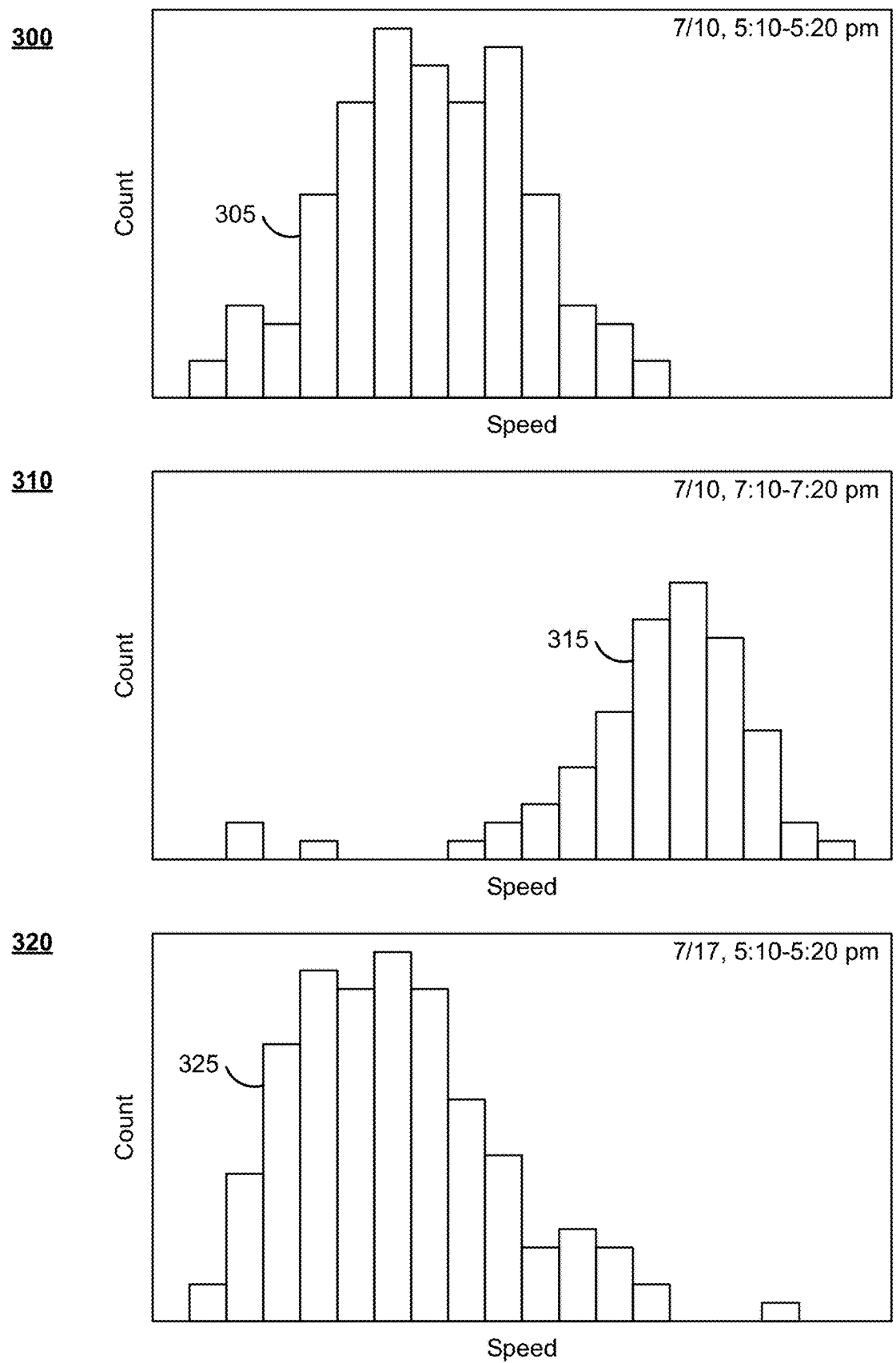
FIG. 3 graphically illustrates the generation of speed histograms, in an embodiment.

FIG. 3 graphically illustrates the generation of speed histograms, in an embodiment. FIG. 3 includes three speed histograms 300, 310, and 320. Each histogram 300, 310, and 320 corresponds to a given section of a road. The first histogram 300 includes a set of counts 305, each count associated with a speed. The first histogram 300 includes speed data reflecting the observed speed of travel for many drivers on the road segment between 5:10 and 5:20 pm on Jul. 10, 2017. The histogram 300 includes low counts at very low speeds, high counts at moderate speeds, and low counts at high speeds. For example, if each bar 305 corresponds to a 5 mile per hour ("mph") window (e.g., 0-5 mph, 5-10 mph, etc.), the histogram 300 shows no drivers at 0-5 mph, and the highest count of drivers at 30-35 mph.

The second histogram 310 includes a second set of counts 315, each count associated with a speed. The second histogram 310 includes speed data reflecting the observed speed of travel for many drivers between 7:10 and 7:20 pm on Jul. 10, 2017. The histogram 310 includes low counts at low and moderate speeds, and higher counts at high speeds. Overall, the histogram 310 has lower total counts than the histogram 300, indicating that less traffic was observed during this time. In addition, the traffic reflected in histogram 310 was flowing faster than the traffic in histogram 300; if each bar 315 corresponds to a 5 mph window (e.g., 0-5 mph, 5-10 mph, etc.), the histogram 310 shows the highest count of drivers were travelling at 70-75 mph.

The third histogram 320 include a third set of counts 325 reflecting the observed speed of travel for many drivers between 5:10 and 5:20 pm on Jul. 17, 2017. The third histogram 320 shows counts 325 for data collected exactly a week after the data reflected in the counts 305 in the first histogram 300. As may be expected, the overall shape of the histogram 320 is similar to the shape of the histogram 300, taken a week prior.

To generate a histogram, such as histograms 300, 310, and 320, the speed estimation instructions 115 include an instruction to identify a plurality of observed speeds for a segment of a road in a plurality of traces including the segment of the road. The traces may have been received from a set of user devices, e.g., mobile devices 145. The speed observations may be determined by processing traces stored in the telemetry data 135, e.g., by looking up the times recorded in the trace at each end of the road segment.

The speed estimation instructions 115 include an instruction to identify a set of discrete values in the plurality of observed speeds. The set of discrete values may be values within a predetermined range, and they may correspond to a predetermined set of discrete values. For example, the identified discrete values may be set to all whole numbers, even whole numbers, odd whole numbers, half numbers, values at other intervals that are less than 1, numbers divisible by 5, or any other set of values. The discrete values may correspond to a range; for example, if the discrete values are numbers divisible by 5, each discrete value may map to range of speeds centered on a number divisible by 5 (e.g., a discrete value of 10 mph may include speeds between 7.5 mph and 12.5 mph), or each discrete value may map to a range of speeds bounded on one side by the discrete value (e.g., a discrete value of 10 mph may include speeds between 5 mph and 10 mph). The discrete values may vary based on a country, state, county, region, city, road type, road, etc. The discrete values may not be evenly separated, e.g., the values may be 0 mph, 10 mph, 20 mph, 25 mph, 30 mph, 32 mph, 34 mph, 35 mph, 36 mph, etc.

The set of predetermined discrete values may be set to cover any range. For example, a range of 0 to 160 kilometers per hour (0 to approximately 100 miles per hour), or 0 to 200 kilometers per hour (0 to approximately 125 miles per hour) may be used. A single range may be used for all roads, or the range used may depend on the type of road, the country, state, county, city, the speed limit of the road, previously observed speeds for the road, or based on any other factor or a combination of factors. Typically, the range should capture the expected range of possible travel speeds on a given road. Reported or calculated speeds above the range may be noise or incorrect speed observations that are ignored. In some embodiments, noise is identified or filtered using other factors than speed, such as large changes in speed from one data point to another, impossible speeds or data point locations, or any other factors or variables.

Identifying the discrete values in the plurality of observed speeds may further involve mapping each observed speed to one of the discrete values. The discrete values may be a stored set of discrete values. For example, the speed estimation instructions 115 may include instructions to round a speed observation up or down as needed so that it matches one of a predetermined, stored plurality of discrete values. Alternatively, if each stored discrete value corresponds to a range, the speed estimation instructions 115 may instruct the mapping application 110 to identify the range in which a speed observation falls within.

The speed estimation instructions 115 further include an instruction to determine a count for each of the plurality of discrete values. In particular, each of the observed speeds that corresponds to one of the discrete values is included in the count for that discrete value. The count of all of the discrete values may be stored in a histogram data structure, or may be stored in another data structure (e.g., an array) that can be represented as a histogram. The histograms may be generated for any suitable time period, such as every 5 minutes, every 10 minutes (as shown in FIG. 3), every 15 minutes, every hour, every 4 hours, etc. The time period for histogram generation may vary based on any suitable factors included, but not limited to: whether a current time is in rush hour, holidays, non-holidays, morning/afternoon/evening/night, day, week, month, year, weather, city, state, region, country, etc. The histograms track the count, or number of occurrences, of each discrete value. The histograms may be weighted, based on any factor or factors, such as the quality or accuracy of the data. Further, the number of occurrences may be based a number of traces that pass through the road (i.e., the number of vehicles), the number of speed data points (i.e., computed from two consecutive location data points), or any other standard. In some embodiments, a single vehicle trip can contribute multiple occurrences to a single histogram. By generating these histograms, the amount of storage space needed is vastly reduced compared to previous methods for storing observed speed data. Further, any subsequent processing is greatly simplified as there are substantially fewer numbers to work with, leading to faster computation. Further still, the histograms may be generated in parallel, and the generation and storage the histograms may be distributed across multiple computing devices, thereby greatly increasing the speed and ease of determining an accurate speed estimation.

In some embodiments, the speed observations are digitally stored as sets of counts of multiple observations occurring at a plurality of different speed magnitudes. For example, the speed observations could be stored as an array of two hundred memory locations or memory addresses that store counts of speed observations where the first memory location stores counts of observed speed values of 1 km/h, the second memory location is for counts of speeds observed at 2 km/h, etc.

Figure 4:
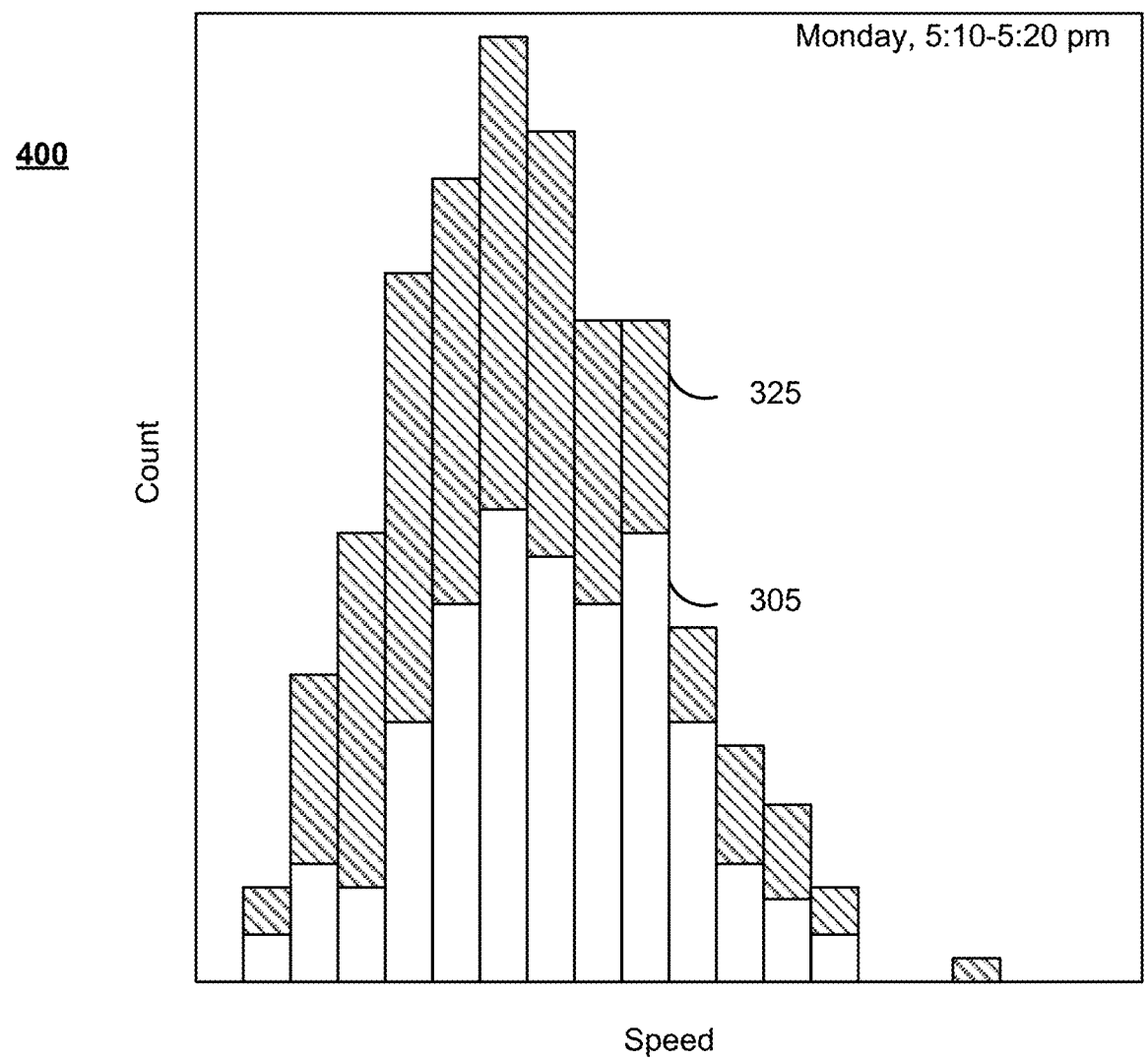
FIG. 4 graphically illustrates an example implementation of aggregating speed data, in an embodiment.

FIG. 4 graphically illustrates an example implementation of aggregating speed data, in an embodiment. The speed estimation instructions 115 further include an instruction to aggregate the counts for the plurality of traces including the segment to create aggregated counts for the segment. For example, if the aggregate counts are stored as a histogram data structure or an array, the instruction would be an instruction to generate an aggregated histogram or an array, such as the aggregate histogram 400 shown graphically in FIG. 4. The aggregate histogram 400 includes an aggregate of the counts 305 of histogram 300 and the counts 325 of histogram 320, shown in FIG. 3. The histograms 300 and 320 included two weeks of data for the Monday, 5:10-5:20 time period. Thus, the aggregate histogram 400 reflects the speed profile for Mondays, 5:10-5:20 pm, and may be used to estimate a speed for the following Monday, July 24 between 5:10 and 5:20 pm.

As shown in FIG. 4, aggregated histogram data is generated using multiple of the previously generated histograms. In other words, histograms from multiple time periods, sequential or not, are combined. As another example, an aggregated histogram may be generated for rush hour traffic, such as from 4:00 pm to 7:00 pm, by combining all histograms from 4:00 pm to 7:00 pm for each weekday for the past week. The time range of "rush hour" may vary based on city, state, country, region, type of road, time of year, day, month, or based on any other variable or combination of variables. As another example, an aggregated histogram may be generated for the weekend by combining histogram data from only Saturdays and Sundays, or particular times of day on Saturday and/or Sunday. Some aggregated histograms can be created for holidays, while other aggregated histograms specifically exclude holidays (e.g., the aggregated histogram for Mondays between 7:00 am and 7:20 am may not include data from Labor Day, since this would not be very useful for determining Monday morning traffic on non-holidays). Any number of aggregated histograms may be generated, and multiple aggregated histograms may be calculated from the same histograms (e.g., a Monday, July 31, 7:00-7:20 could be used in both a Monday, 7:00-7:20 am histogram and a weekday, 7:00-7:20 histogram). The aggregated histograms may represent any combination of times, and may be calculated using any amount of prior histogram data, such as a most recent 2 weeks of histogram data or a most recent few days of histogram data. In still other embodiments, different histograms or sets of histograms are created for different types or classes of vehicles (e.g., personal automobiles, trucks, buses, taxis, ambulances, motorcycles, etc.), and different aggregated histograms are be generated for each vehicle type or class.

In some embodiments, the aggregated histograms are generated using a sliding window of time, such as a most recent week or most recent month, to ensure that the aggregated histograms represent recent data. The sliding window may be any amount of time. In another embodiment, new data is added to an old aggregate, sometimes referred to as a snowball method, and the old aggregate data may optionally be scaled down before adding the new data. The aggregated histograms may be generated or updated on a scheduled basis, such as daily or weekly, or in response to a specific request.

In one particular embodiment, data is removed from the aggregated counts as the data becomes old. The speed estimating instruction 115 may include instruction to determine a new count for each of the plurality of discrete values (e.g., a new set of counts based on recent data) and to add the additional counts to the aggregated counts for the segment. The instructions may further include instructions to determine that another set of data (e.g., a set of traces) is the oldest set of data used in the aggregated counts, and to remove the counts of the oldest set of data from the aggregated counts for the segment. This may be done by looking up the counts of the oldest set of data and subtracting the counts from the set of aggregated counts.

In other embodiments, each time a new set of counts is determined, a new set of aggregated counts is calculated based on the most recent sets of counts. For example, a set of aggregated counts can include all of the related sets of counts from the past few days, the past week, the past month, etc. Only the most recent sets of counts (e.g., the 5 most recent sets of counts, or the 10 most recent sets of counts, etc.) are included in the aggregate counts. Any sets of counts that are no longer included in any set of aggregate counts can be deleted. The new aggregated counts may be calculated as soon as new data is available, or on a periodic basis, e.g., a new set of aggregated counts may be calculated at a set time each day.

In some embodiments, the speed estimation instructions 115 include an instruction to store histogram and aggregated histogram data in the database 120, e.g., in aggregated telemetry data 140. In other embodiments, the mapping application 110 correlates the segment of the road with digital map data, e.g., electronic map data 130, and stores the aggregated counts for the segment of the road with the digital map data that correlates to the segment of the road. The histogram and aggregated histogram data may be stored in any manner in any type of database or other electronic digital storage mediums.

The speed estimation instructions 115 further include an instruction to determine a speed estimate from the aggregated counts for the plurality of traces including the segment. The speed estimate may be determined in response to a request for a speed estimate for the segment. The request for the speed estimate may be a request from an application or user. Alternatively, the speed estimates may be generated in advance of any requests, and retrieved in response to a request for a speed estimate for the segment. The speed estimate may represent a maximum expected speed, an average speed, or any other type of speed estimate. The speed estimate may be a simple average, any form of mean, an estimated value at a specific percentile, or any other statistic(s). For example, due to the varying speeds of drivers on the road, and how a slow or stopped driver, or speeding driver, may affect the overall speeds, a percentile that is not near the edge of the histogram (e.g., a percentile between the $5^{th}$ percentile and the $95^{th}$ percentile) may be used as the speed estimate. The percentile used may vary based on a country, state, county, region, city, road type, previously observed speeds, the speed limit of the road, or based on any other factor or a combination of factors. The desired percentile may be calculated from the aggregated histogram data using a variety of methods. Optionally, different roads may use different statistical methods to estimate speed. Further still, different roads may use different percentiles in estimating speed. For example, a primary road may use the $50^{th}$ percentile, a secondary road use the $50^{th}$ percentile, a tertiary road use the $50^{th}$ percentile, a motorway use the $60^{th}$ percentile, a trunk use the $60^{th}$ percentile, and an unclassified or other road may use the $40^{th}$ percentile. Any other percentiles may be selected for the road types. There may be additional factors taken into consideration when estimating the speed, such as a maximum speed, a maximum speed for a vehicle associated with a driver, a speed profile of the driver requesting the speed, or other factors.

In some embodiments, the speed estimation instructions 115 include instructions for estimating arrival time at a destination using the speed estimation, and sending the arrival time to the mobile computing device 145. For example, the mapping application 110 may generate a request for the speed estimate for the segment based on a request for an arrival time, and the speed estimation instructions 115 may include an instruction to generate the arrival time based on the determined speed estimate for the road segment. Estimating the arrival time may involve aggregating multiple speed estimations for multiple road segments.

Alternatively, any other suitable element of FIG. 1 may be programmed or configured to estimate arrival time at a destination using the speed estimation from the speed estimation instructions 115 and send the arrival time to a computing device, such as the mobile computing device 145. Once determined, the estimated arrival time may be sent to a requesting application or device, for subsequent display to a user who is traveling to the destination.

In some embodiments, if multiple aggregate histograms are relevant to a particular time, the speed estimation instructions 115 include instructions for selecting between multiple aggregate histograms or combining speed estimates from multiple aggregate histograms. For example, if the mapping application 110 receives a speed estimation request at 7:10 am on a Monday, both a Monday, 7:00-7:20 am histogram and a weekday, 7:00-7:20 histogram could be relevant for estimating speed. Accordingly, the speed estimation instructions 115 may determine two speed estimates, one from each histogram, and then calculate an average or weighted average of the two speed estimates. If one of the aggregate histograms has been determined to be historically more accurate, the speed estimation instructions 115 may include an instruction to select the more accurate speed estimate, or weight that estimate more heavily. If different aggregated histograms are available for different types or classes of vehicles, the aggregated histogram or histograms relevant to the type of vehicle for which the speed estimate is requested may be used.

In some embodiments, multiple aggregate histograms may be combined, e.g., if an aggregate histogram includes below a threshold amount of data. For example, a low traffic area may have too little data to generate accurate speed estimates for particular times of day (e.g., mid-day or nighttime), and in some cases, a time window may have no data at all. In such cases, the speed estimation instructions 115 may include instructions to combine windows or use longer windows (e.g., instead of using default 10-minute long windows, use hour long or multi-hour windows during nighttime). Conversely, the speed estimation instructions 115 may include an instruction to split up time windows for high-traffic times and road segments, e.g., using 2-minute or 5-minute windows instead of default 10-minute windows for highly-traffic roads during peak periods. These window sizes may be used when creating the base counts or histograms or, for the longer windows, when creating the aggregate counts or aggregate histograms.

In one embodiment, the speed estimation instructions 115 include instructions to calculate a total count for a segment by adding the counts of the aggregated counts, and compare the total count for the segment to a threshold. In response to determining that the total count for the segment is below the threshold, the speed estimation instructions 115 include instructions to identify a second segment of the road that is proximate to the segment of the road and in which traffic travels in an opposite direction from traffic on the segment of the road, and aggregate the counts for the plurality of traces including the segment of the road and counts for a plurality of traces including the second segment of the road in which traffic travels in the opposite direction. Because the speeds for opposite sides of a road are typically similar in low-traffic conditions, using data for both sides of the road increases the amount of data and may increase the overall accuracy of a speed estimate.

In one embodiment, the speed estimation instructions 115 include instructions to determine a confidence level in the determined speed estimate, and compare the confidence level to a threshold confidence level for the speed estimate to determine that the confidence level exceeds the threshold confidence. The mapping application 110 may calculate the confidence level from the aggregate count distribution. In response to determining that the threshold confidence level exceeds the threshold confidence level, the speed estimation instructions 115 may instruct the mapping application 110 to generate an alert. In response to the alert, the mapping application 110 may inform the mobile computing device 145 that the speed estimate may not be accurate, or the mapping application 110 may not provide a speed estimate to the mobile computing device 145.

Figure 5:
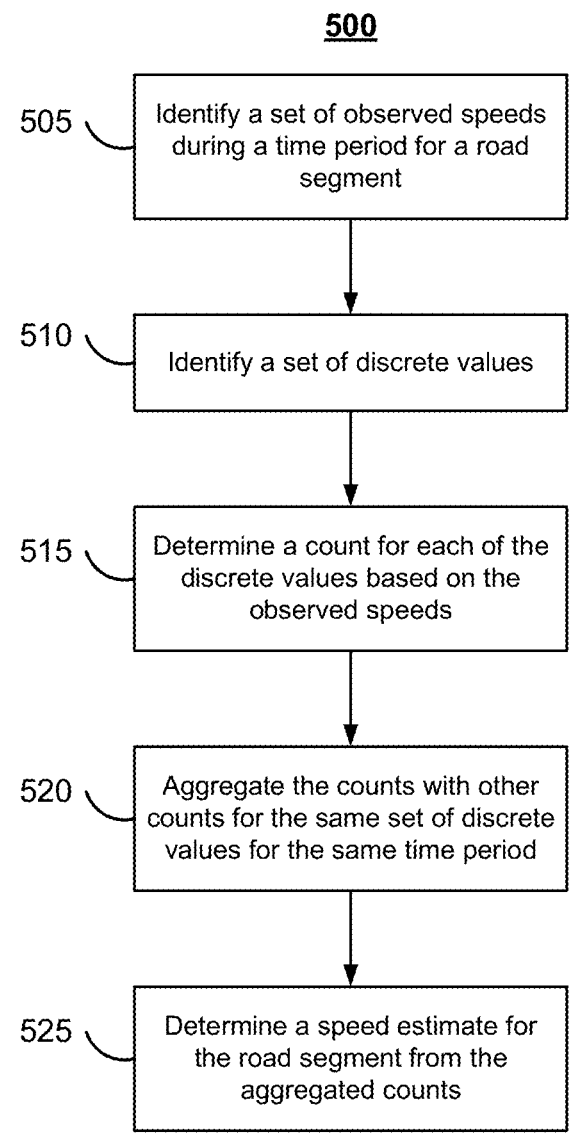
FIG. 5 shows a process for aggregating telemetry data and determining a speed estimate, according to one embodiment.

FIG. 5 shows a process 500 for aggregating telemetry data and determining a speed estimate, according to one embodiment. In various embodiments, the operations of the process 500 of FIG. 5 may be implemented in programming by a server computer 105 or its components as described herein. For example, the operations of process 500 may be performed by the mapping application 110 according to speed estimation instructions 115 as described with reference to FIGS. 1, 3, and 4. In some examples, the server computer

105 may execute a set of instructions or sequence of instructions (e.g., the speed estimation instructions 115) to control the functional elements of server computer 105 to perform the functions described below. Additionally or alternatively, server computer 105 may perform aspects of the functions described below using special-purpose hardware. In some embodiments, the speed estimation instructions 115 may instruct the server computer to interact with the database 120 to perform the functions described below using database interface 117. In some embodiments, one or more functions described below may be performed by the mobile computing device 145.

At 505, the server computer 105 executing the mapping application 110 with the speed estimation instructions 115 identifies a set of observed speeds during a time period for a road segment. For example, the server computer 105 may analyze a set of traces that contain data for the road segment during the time period. For each trace, the server computer 105 may calculate a speed at which the source of the trace (e.g., a mobile computing device 145) travelled through the road segment.

At 510, the server computer 105 executing the mapping application 110 with the speed estimation instructions 115 identifies a set of discrete values. For example, the server computer 105 may map the observed speed for each of the traces to a discrete value in a predetermined set of discrete values, e.g., a set of speed values separated by 5 mph or kph (e.g., 0 mph, 5 mph, 10 mph, etc.), 2 mph or kph, 1 mph or kph, 0.5 mph or kph, or any other set of speed values. To identify the set of discrete values in the observed speeds, the server computer 105 may round the observed speed to the nearest discrete value or determine a range corresponding to a discrete value that each observed speed falls within.

At 515, the server computer 105 executing the mapping application 110 with the speed estimation instructions 115 determines a count for each of the discrete values based on the observed speeds. For example, the server computer 105 may add the discrete value corresponding to each observed speed to a histogram data structure, which can be represented visually in a similar manner to histograms 300, 310, and 320, described with respect to FIG. 3. Each bar of the histograms 300, 310, and 320 represents a count for a discrete value.

At 520, the server computer 105 executing the mapping application 110 with the speed estimation instructions 115 aggregates the counts with other counts for the same set of discrete values for the same time period. For example, the server computer 105 may aggregate other counts from the same time period on different days. As another example, if the total number of counts in a set of counts is low, the server computer 105 may aggregate the counts with other counts from one or more adjacent time periods from the same day and/or additional days. An example of aggregated counts from two days for the same time period is shown visually in the histogram 400 in FIG. 4. Each bar of the histogram 400 represents the sum of the counts 305 in first histogram 300 and the counts 325 in the third histogram 320.

At 525, the server computer 105 executing the mapping application 110 with the speed estimation instructions 115 determines a speed estimate for the road segment from the aggregated counts. For example, the server computer 105 may identify a point in the aggregated counts that is a predetermined percentile through the distribution of aggregated counts, and return the discrete value at that percentile. Alternatively, the server computer 105 may determine an average, median, mode, or other statistical value based on the distribution of aggregated counts.

In some embodiments, the server computer 105 executing the mapping application 110 with the speed estimation instructions 115 determines the speed estimate in response to request for a speed estimate. For example, the server computer 105 may receive a request for directions or a request for an estimated arrival time from the mobile computing device 145. In response to this request, the server computer 105 may identify the relevant road segments for one or more possible routes and generate a request for a speed estimate for each of the road segments. In other embodiments, the server computer 105 identifies the relevant road segments for one or more possible routes and retrieves pre-computed speed estimates for each of the road segments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method for speed estimation, the method comprising:

receiving, from each of a plurality of devices, a plurality of traces, each trace comprising a set of location coordinates of a path traversed by the device and a timestamp associated with the set of location coordinates;

identifying, based on the received pluralities of traces, one or more road segments that have been traversed by at least one of the plurality of devices;

for each of the identified one or more road segments:
  determining, based on the received pluralities of traces, a plurality of observed speeds for the road segment for a first time interval, wherein each of the plurality of observed speeds for the road segment for the first time interval is a speed at which a device of the plurality of devices traversed the road segment during the first time interval;
  identifying a plurality of discrete values, each of the plurality of discrete values being representative of a different range of speeds;
  mapping each of the plurality of observed speeds for the road segment for the first time interval to one of the plurality of discrete values based upon a range of speed within which is the observed speed;
  determining a count for each of the plurality of discrete values for the road segment for the first time interval by counting how many observed speeds for the road segment for the first time interval are mapped to the discrete value;
  determining, based on the received pluralities of traces, a plurality of observed speeds for the road segment for a second time interval spanning a time range immediately preceding or following the first time interval;
  mapping each of the plurality of observed speeds for the road segment for the second time interval to one of the plurality of discrete values;
  determining a count for each of the plurality of discrete values for the road segment for the second time interval by counting how many observed speeds for the road segment for the second time interval are mapped to the discrete value; and aggregating the determined counts for each of the plurality of discrete values for the first and second time intervals; and determining a speed estimate for traversing a road segment based on the aggregated counts for the road segment.

2. The method of claim 1, further comprising:
correlating the road segment with digital map data representative of the road segment; and
storing the aggregated counts for the road segment with the digital map data that correlates to the road segment.

3. The method of claim 1, wherein identifying the plurality of discrete values in the plurality of observed speeds comprises identifying discrete values in a stored set of discrete values.

4. The method of claim 1, further comprising:
storing the count for each of the plurality of discrete values for each time interval in at least one of a histogram data structure and an array, wherein counts for each of the plurality of discrete values for different time intervals are stored separately.

5. The method of claim 1, further comprising:
storing the aggregated counts for each of the plurality of discrete values for each road segment in at least one of an histogram data structure and an array.

6. The method of claim 1, further comprising:
determining a confidence level in the determined speed estimate;
comparing the confidence level to a threshold confidence level for the speed estimate to determine that the confidence level exceeds the threshold confidence level; and
in response to determining that the threshold confidence level exceeds the threshold confidence level, generating an alert.

7. The method of claim 1, wherein determining the speed estimate from the aggregated counts comprises:
estimating the speed based on a predetermined percentile within the distribution of the aggregated counts.

8. The method of claim 1, further comprising:
receiving a request for an arrival time estimate;
retrieving the determined speed estimate based on the request for the arrival time estimate; and
generating the arrival time estimate in response to the request for the arrival time based on the determined speed estimate.

9. The method of claim 1, further comprising:
calculating a total count for a particular road segment of the one or more road segments by summing the counts of the aggregated counts for the road segment;
comparing the total count for the particular road segment to a threshold total count; and
in response to determining that the total count for the particular road segment is below the threshold total count:
identifying a second road segment that is proximate to the particular road segment and in which traffic travels in an opposite direction from traffic on the particular road segment;
aggregating the counts for the particular road segment and counts for the second road segment; and
using the aggregated counts for the particular road segment and the second road segment as the counts for the particular road segment.

10. The method of claim 1, further comprising:
determining that an identified road segment is in a low traffic area;
wherein aggregating the determined counts for each of the plurality of discrete values for the first and second time intervals is responsive to determining that the identified road segment is in the low traffic area.

11. A non-transitory computer-readable storage containing computer program code executable on a processor for providing an improvement in speed estimation for route planning, the computer program code for:
receiving, from each of a plurality of devices, a plurality of traces, each trace comprising a set of location coordinates of a path traversed by the device and a timestamp associated with the set of location coordinates;
identifying, based on the received pluralities of traces, one or more road segments that have been traversed by at least one of the plurality of devices;
for each of the identified one or more road segments:
determining, based on the received pluralities of traces, a plurality of observed speeds for the road segment for a first time interval, wherein each of the plurality of observed speeds for the road segment for the first time interval is a speed with which a device of the plurality of devices traversed the road segment during the first time interval;
identifying a plurality of discrete values, each of the plurality of discrete values being representative of a different range of speeds;
mapping each of the plurality of observed speeds for the road segment for the first time interval to one of the plurality of discrete values based upon a range of speed within which is the observed speed;
determining a count for each of the plurality of discrete values for the road segment for the first time interval by counting how many observed speeds for the road segment for the first time interval are mapped to the discrete value;
determining, based on the received pluralities of traces, a plurality of observed speeds for the road segment for a second time interval spanning a time range immediately preceding or following the first time interval;
mapping each of the plurality of observed speeds for the road segment for the second time interval to one of the plurality of discrete values;
determining a count for each of the plurality of discrete values for the road segment for the second time interval by counting how many observed speeds for the road segment for the second time interval are mapped to the discrete value; and
aggregating the determined counts for each of the plurality of discrete values for the first and second time intervals; and
determining a speed estimate for traversing a road segment based on the aggregated counts for the road segment.

12. The computer-readable medium of claim 11, further containing computer program code executable on a processor for:
correlating the road segment with digital map data representative of the road segment; and
storing the aggregated counts for the road segment with the digital map data that correlates to the road segment.

13. The computer-readable medium of claim 11, wherein the computer program code executable on a processor for identifying the plurality of discrete values in the plurality of observed speeds comprises computer program code executable on a processor for:
 identifying discrete values in a stored set of discrete values.

14. The computer-readable medium of claim 11, further containing computer program code executable on a processor for:
 storing the count for each of the plurality of discrete values for each time interval in at least one of a histogram data structure and an array, wherein counts for each of the plurality of discrete values for different time intervals are stored separately.

15. The computer-readable medium of claim 11, further containing computer program code executable on a processor for:
 storing the aggregated counts for each of the plurality of discrete values for each road segment in at least one of an histogram data structure and an array.

16. The computer-readable medium of claim 11, further containing computer program code executable on a processor for:
 determining a confidence level in the determined speed estimate;
 comparing the confidence level to a threshold confidence level for the speed estimate to determine that the confidence level exceeds the threshold confidence level; and
 in response to determining that the threshold confidence level exceeds the threshold confidence level, generating an alert.

17. The computer-readable medium of claim 11, wherein the computer program code executable on a processor for determining the speed estimate from the aggregated counts comprises computer program code executable on a processor for:
 estimating the speed based on a predetermined percentile within the distribution of the aggregated counts.

18. The computer-readable medium of claim 11, further containing computer program code executable on a processor for:
 receiving a request for an arrival time estimate;
 retrieving the determined speed estimate based on the request for the arrival time estimate; and
 generating the arrival time estimate in response to the request for the arrival time based on the determined speed estimate.

19. The computer-readable medium of claim 11, further containing computer program code executable on a processor for:
 calculating a total count for a particular road segment of the one or more road segments by summing the counts of the aggregated counts for the road segment;
 comparing the total count for the particular road segment to a threshold total count; and
 in response to determining that the total count for the particular road segment is below the threshold total count:
  identifying a second road segment that is proximate to the particular road segment and in which traffic travels in an opposite direction from traffic on the particular road segment;
  aggregating the counts for the particular road segment and counts for the second road segment; and
  using the aggregated counts for the particular road segment and the second road segment as the counts for the particular road segment.

20. A data processing method for speed estimation, the method comprising:
 receiving, from each of a plurality of devices, a plurality of traces, each trace comprising a set of location coordinates of a path traversed by the device and a timestamp associated with the set of location coordinates;
 combining the received pluralities of traces with a historic set of traces to produce a combined set of traces;
 identifying a subset of traces in the combined set of traces wherein each trace in the subset of traces is associated with a timestamp at least a threshold time old;
 removing the subset of traces from the combined set of traces to produce an updated set of traces;
 identifying, based on the updated set of traces, one or more road segments that have been traversed by at least one of the plurality of devices;
 for each of the identified one or more road segments:
  determining, based on the updated set of traces, a plurality of observed speeds for the road segment for a first time interval, wherein each of the plurality of observed speeds for the road segment for the first time interval is a speed at which a device of the plurality of devices traversed the road segment during the first time interval;
  identifying a plurality of discrete values, each of the plurality of discrete values being representative of a different range of speeds;
  mapping each of the plurality of observed speeds for the road segment for the first time interval to one of the plurality of discrete values based upon a range of speed within which is the observed speed;
  determining a count for each of the plurality of discrete values for the road segment for the first time interval by counting how many observed speeds for the road segment for the first time interval are mapped to the discrete value; and
 determining a speed estimate for traversing a road segment of the one or more road segments based on determined counts for the road segment.

* * * * *